Sept. 17, 1940.         O. A. PARKER         2,215,132
METHOD AND APPARATUS FOR DISTRIBUTING LIQUID SOLUTIONS
Filed May 17, 1938        2 Sheets-Sheet 1
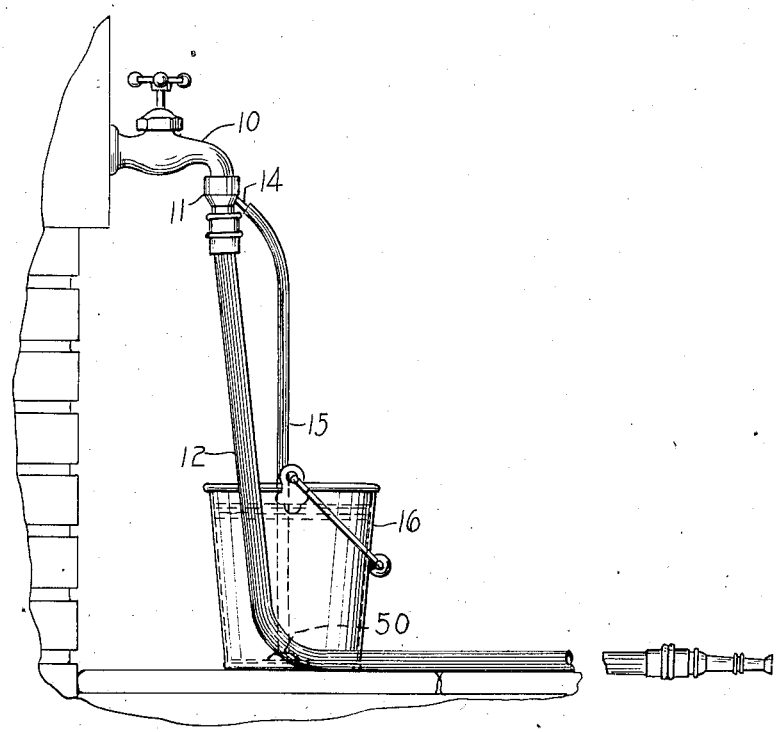
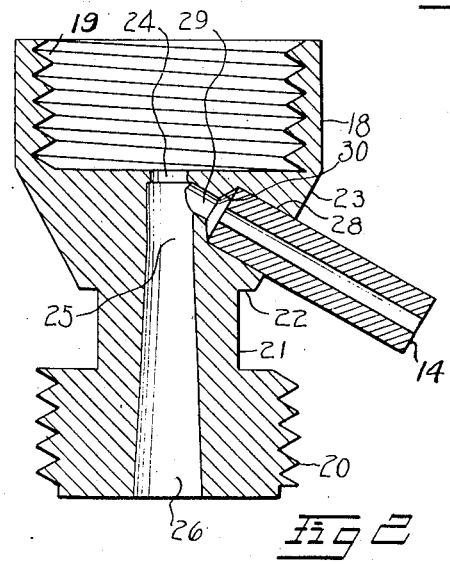
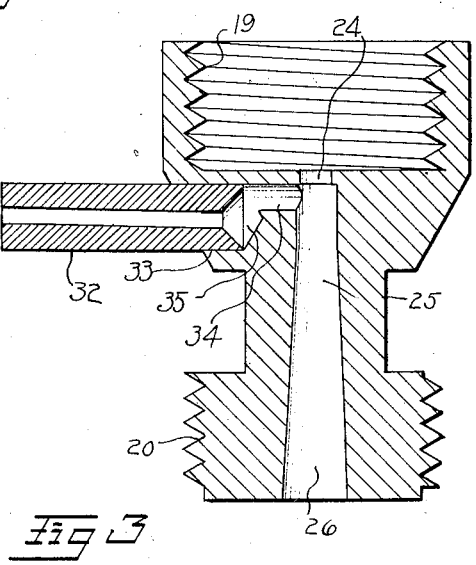
INVENTOR.
ORREL A. PARKER
BY
ATTORNEY.

Sept. 17, 1940. O. A. PARKER 2,215,132
METHOD AND APPARATUS FOR DISTRIBUTING LIQUID SOLUTIONS
Filed May 17, 1938 2 Sheets-Sheet 2
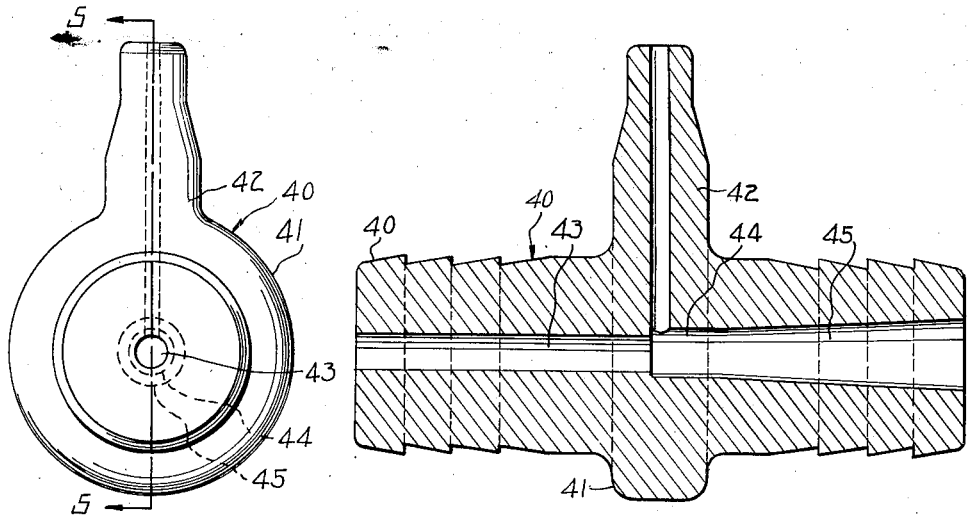
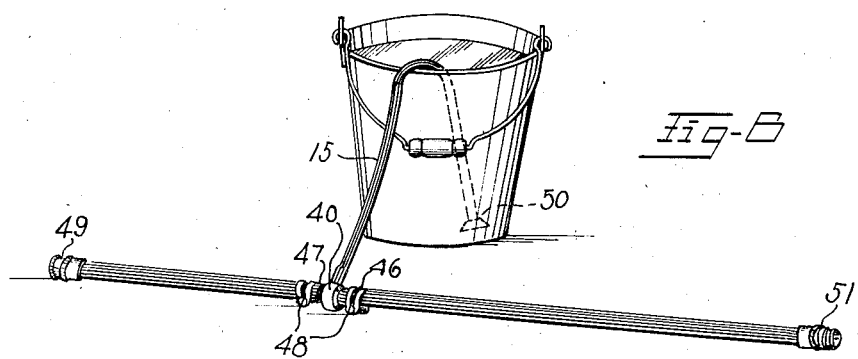
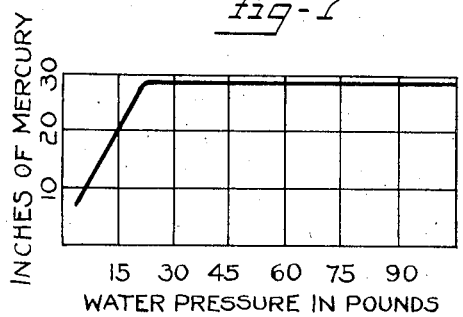
WATER PRESSURE IN POUNDS
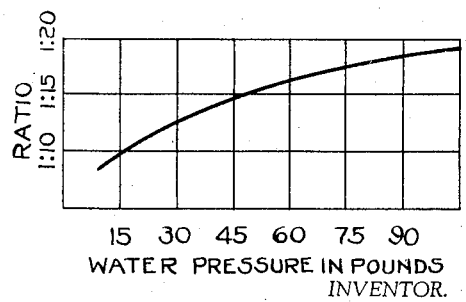
WATER PRESSURE IN POUNDS
INVENTOR.
ORREL A. PARKER
BY
ATTORNEY.

Patented Sept. 17, 1940

2,215,132

UNITED STATES PATENT OFFICE 2,215,132

METHOD AND APPARATUS FOR DISTRIBUTING LIQUID SOLUTIONS

Orrel A. Parker, Warrensville, Ohio

Application May 17, 1938, Serial No. 208,423

5 Claims. (Cl. 103—262)

This invention relates to methods and apparatus for distributing liquid solutions, and relates more particularly to applying liquid fertilizer, insecticides, fungicides, weed killer and other chemical solutions in desired amounts through employing a conventional garden hose with ordinary pressure.

In applying liquid fertilizers, such as sulphate of ammonia to lawns, it is necessary that the concentration of the fertilizer be maintained within definite limits since too strong a solution will burn or injure the grass or plants and an unduly weak solution will have little beneficial fertilizing effect. Prior methods of applying fertilizer, with which I am familiar, consisted in applying a concentrated solution with a sprinkling can, applying the dry chemical by hand, and mixing the chemical with dry soil or sand applying the mixed chemical and soil either by hand or a spreader. All of these methods require immediate thorough watering after application, thereby not only involving a laborious process, but frequently resulting in injury due to uneven application and insufficient "washing down."

I am also familiar with a method of applying liquid fertilizers by a nozzle arrangement wherein the fertilizer is drawn from a pail or the like through a tube to the nozzle. However, this necessitates carrying the pail during operation since it must always be adjacent the nozzle.

I have devised a water jet pump adapted to be used with the conventional garden hose and operable at the pressures normally available for domestic use whereby the fertilizer may be applied and washed down in one relatively fast operation and at the same time, the amount of fertilizer in a given volume of water may be closely controlled. The pump is adapted to be inserted at the sill cock or faucet which eliminates the necessity of carrying a pail. The pump may also be inserted at any desired point in a hose line or conduit but preferably not more than fifty feet from the nozzle end of the hose.

It is a primary object of my invention therefore, to provide a pump device adapted to be employed with a conventional garden hose for applying liquid fertilizers, insecticides and fungicides, and the like, with precision.

Another object of my invention is to provide a water jet pump which has a high degree of suction and which has substantially the same suction despite a wide variation in water pressure, above a minimum value.

Another object of my invention is to provide a device adapted to be associated with a conventional garden hose for applying liquid fertilizer, or other chemicals and wherein the amount of chemical discharged with a given volume of water is maintained within desirable limits despite substantial variation in water pressure.

Another object of my invention is to provide a simple and efficient method of applying liquid fertilizers and the like, with precision.

Another object of my invention is to provide a pump device for applying fungicide chemicals and the like which is impervious to the action of mercuric and mercurour chloride.

Another object of my invention is to provide a pump device for applying treating chemicals to a lawn or the like which is disposed at a point in a hose line remote from the nozzle to eliminate moving the chemical container as the nozzle portion of the hose is moved.

Other objects of my invention and the invention itself will become increasingly apparent from a consideration of the following description and drawings wherein:

Fig. 1 is a diagrammatic view of an apparatus embodying my invention;

Fig. 2 is a longitudinal medial sectional view of a pump device illustrated in Fig. 1;

Fig. 3 is a view similar to Fig. 2 showing a modified form of pump device;

Fig. 4 is an end elevational view of another form of pump device which I may employ;

Fig. 5 is a section taken along the lines 5—5 of Fig. 4;

Fig. 6 is an elevational view of a unit adapted to be inserted in a hose line and having the pump device of Figs. 4 and 5 associated therewith.

Fig. 7 is a diagram illustrating the efficiency of the pump under varying water pressure; and Fig. 8 is a diagram illustrating the amount of material discharged in a given amount of water under varying water pressure.

Referring now to the drawings, and particularly Fig. 1, I have indicated at 10, a conventional sill cock or faucet from which water may be drawn under pressure, the water pressure generally varying from 30 pounds per square inch, to 90 pounds. The faucet is provided with the usual threaded tubular portion for securing a hose thereto, but in the present instance, a pump device generally indicated at 11 is threadedly and sealingly secured to the faucet and also to a hose 12 which is provided with the usual nozzle. Extending laterally from the pump device 11 is a tube 14 over which is telescoped one end of a relatively small rubber tube 15, the lower end of the tube being projected into a pail 16 containing a solution of chemical material for treating lawns, plants, or the like.

Although, I hereinafter describe the apparatus in connection with the treatment of lawns, it is understood that its use is not limited thereto and it is susceptible of various other uses such as treating shrubbery, disinfecting poultry houses, and for similar purposes.

The pump device 11 is of the water jet type and is best illustrated in Fig. 2 wherein a generally tubular body 18 is provided with a cylindrical portion 19 internally threaded whereby the device may be secured to the faucet 10. The opposite end of the device is provided with an externally threaded shoulder 20 adapted to engage a conventional connector on hose 12. A portion of reduced diameter, indicated at 21, extends from shoulder 20 to a shoulder 22 and a tapered portion 23. A thin walled orifice 24 opens into a cylindrical bore 25, which merges with a tapered bore 26.

The wall of the tapered portion 23 is formed with a bore 28 joining a reduced diameter bore 29 by a preferably tapered shoulder 30. The bore 28 is adapted to have one end of a tube 14 press fitted thereinto to form a sealing engagement between the tube and portion 23. The projecting end of tube 14 will be telescoped within the upper end of tube 15 to be sealed therewith. It will be noted that tube 14 is disposed at an acute angle relative to the longitudinal axis of the device since this permits tube 15 to bend at a lesser angle and provides a more direct flow of liquid from pail 16 to the pump device. Also, this permits bore 29 to open into the cylindrical bore 25 closely adjacent orifice 24. However, I find that the angle at which tube 14 is disposed has no determinable effect on the functioning of the pump device and in Fig. 3, I have shown a tube 32 press fitted into a bore 33 to extend substantially at a right angle from the axis of the device.

In this modification, a reduced bore 34 connecting bore 33 with cylindrical bore 25 is disposed eccentrically of the axis of tube 32. I preferably provide a tapered shoulder as indicated at 32. I preferably provide a tapered shoulder as indicated at 35, since this may be easily provided by employing a boring tool having a conical tip and due to the fact that a tapered shoulder offers little impedance to the flow of liquid.

Ammonium sulphate is commonly employed in fertilizing lawns due to its rich nitrogen content, one hundred pounds being equivalent in nitrogen content to four thousand pounds of good stable manure. It has been found that one ounce of ammonium sulphate to a gallon of water discharged provides an ideal ratio or that approximately two pounds of ammonium sulphate should be applied in fertilizing five hundred square feet of lawn. Thus, in order to apply an ounce of ammonium sulphate with every gallon of water from a solution such as 2 gallons of water containing 2 pounds of ammonium sulphate, it is necessary to draw a gallon of the solution with every fifteen gallons forced through the hose from the faucet or with every 16 gallons discharged. Two gallons is a convenient amount for the ordinary 10 or 12 quart pail and at the concentration indicated a considerable area can be fertilized without requiring re-filling of the pail. When re-filling the pail with chemical solution, closing the nozzle will cause some water to enter the pail through tube 15.

I have found by experiment that the suction of the ordinary water jet pump is relatively low and that they would draw approximately 8 to 10 inches of mercury, whereas, by providing a thin walled orifice entering into a bore or throat having a definite relation in size to the orifice together with a tube opening related to the size of the orifice, I could draw in excess of 29 inches of mercury at sea level and at pressures above 20 pounds per suare inch. Water jet pumps are ordinarily employed merely for discharging liquids from one point to another and the primary concern is volume, whereas in applying a chemical solution to a lawn or the like, the primary concern is the ratio of the chemical material in a given amount of discharged water. Water jet pumps can be designed to draw varying amounts of liquid relative to the amount discharged but are not satisfactory for the use described since a slight change in the ratio between line pressure and back pressure in the hose line due to variation in hose or line pressure, nozzle restriction and the like will cause a considerable decrease in the drawing capacity of the pump because of the low suction capacity. Inasmuch as the water pressure in various localities may vary from 30 pounds to 90 pounds or more and may vary during use of the hose in applying fertilizer and the like, it is necessary to provide a high suction value so that the amount of solution drawn in a given interval will be substantially constant to keep the concentration within desired limits.

I have found that a pump device having an orifice of 9/64 of an inch in diameter, having a wall thickness approximately 1/32 of an inch emptying into a bore or throat having a diameter of 11/64 of an inch and tapered or progressively increased in diameter and extending substantially 1¼ inches together with a suction tube having .052 internal diameter will draw substantially 29 inches of mercury at pressures above 20 pounds, with the back pressure of 50 feet of hose and a substantially open nozzle. I also found that these results were also achieved if the thin walled orifice were replaced by a cylindrical bore of the same diameter and of a length eight to nine times the diameter as indicated at 43, Fig. 5.

Figs. 7 and 8 illustrate in graphic form the results of tests which were made with the pump device described and employing 50 feet of hose, which is the usual length for domestic use. As illustrated in Fig. 7, the suction is practically constant at water pressures greater than 20 pounds (with the back pressure of 50 feet of hose and an open nozzle) and the ratio at the nozzle is varied only by the amount of water passing through the jet. The variance in ratio at the nozzle, is illustrated in Fig. 8, wherein it will be noted that the ratio of liquid drawn by suction to the amount discharged at the nozzle is approximately 1 to 12 at 30 pounds water pressure, and at 80 pounds pressure, it is approximately 1 to 18, and in the middle range of pressure it is about 1 to 16. Fig. 8 illustrates that within practical pressure limits the ratio of solution drawn in the volume of water discharged is within a range wherein sufficient fertilizer will be applied, but not in excess which might injure the grass by burning or the like.

Referring now to Figs. 4 and 5, I have shown a modified form of pump device formed of a plastic material impervious to the action of mercuric and mercurous chlorides and similar fungicides commonly employed by green-keepers for golf courses and the like. as a remedy for brown patch, dollar patch and de-worming.

The pump device comprises a generally tubular body 40 having a generally centrally disposed external flange 41 from which extends a tube portion 42, the body being internally bored to provide a cylindrical portion 43 opening into an enlarged cylindrical bore 44, and the bore 44 merging with a progressively enlarged or tapered bore 45. This construction is similar to the construction described in connection with Figs. 2 and 3, but the thin walled orifice is replaced by the tubular bore 43 of substantial extent. However, the dimensions are otherwise substantially the same as described in connection with Figs. 2 and 3, and I find that the same results are achieved as to suction under varying water pressures.

The body 40 has the opposite end portions serrated or of saw-tooth form to have relatively short hose portions indicated at 46 and 47, of Fig. 6, telescoped thereover and secured to the pump device in the usual manner by clamping rings 48. The opposite end portions of the hose portions engage threaded connector units 49 and 51 adapted to couple with parts of a hose or connect a faucet and a hose in a manner similar to the device of Figs. 2 and 3, and as illustrated in Fig. 1. Tube 15 will be sealingly telescoped over tube 42 with the lower end of the tube 15 being projected into a pail containing fungicide or the like, as illustrated in Fig. 1. I preferably provide a strainer in each instance at the end of the tube 15, as indicated at 50, to prevent foreign material from entering the relatively small diameter suction tube 15.

Although, I have shown and described preferred forms of my invention, I contemplate that numerous and extensive departures may be made therefrom within the scope of the appended claims.

What I claim is:

1. A water jet pump adapted to be interposed between a length of garden hose having a terminal sprinkling nozzle and a source of water supply at any pressure within a range between twenty pounds per square inch and one hundred pounds per square inch, said pump adapted by suction effect to supply to the water from said source a previously prepared chemical solution from a container disposed adjacent said pump, said solution being supplied to the hose by said pump at a substantially constant rate of volume of solution per unit of time independently of variations in water pressure at said source, said pump comprising a tubular body provided at its inlet end with screw threaded means adapted for attachment to a water faucet of an ordinary water supply system and at its discharge end with screw threaded means operable to make connection with the inlet end of a length of garden hose, and a jet orifice disposed longitudinally medially of the body, a discharge portion of the bore of said body on the discharge side of the orifice being tapered with the larger end of said tapered bore portion disposed towards the discharge end of the body, said orifice effecting restricted communication of fluid between the inlet portion of the longitudinal bore of said body and said discharge portion thereof, said body being provided with a relatively small bore extending transversely through a transverse wall of the body with its inner end terminating in an orifice of the inner wall of the bore of said body which is disposed substantially immediately at the beginning of said discharge bore portion at the discharge side of said jet orifice, said jet orifice being approximately 9/64 inches in diameter, and the minimum diameter of all portions of the body bore on the discharge side of said orifice being greater than the diameter of the orifice, and fluid conducting means associated with said body adjacent the outer surface of its lateral wall for effecting communication of said chemical solution from an exterior container to said body through said transverse bore of the body, said tapered bore portion having all opposite side inner wall surfaces extending angularly outwardly relative to each other.

2. A water jet pump adapted to be interposed between a length of garden hose having a terminal sprinkling nozzle and a source of water supply at any pressure within a range between twenty pounds per square inch and one hundred pounds per square inch, said pump adapted by suction effect to supply to the water from said source a previously prepared chemical solution from a container disposed adjacent said pump, said solution being supplied to the hose by said pump at a substantially constant rate of volume of solution per unit of time independently of variations in water pressure at said source, said pump comprising a tubular body provided at its inlet end with screw threaded means adapted for attachment to a water faucet of an ordinary water supply system and at its discharge end with screw threaded means operable to make connection with the inlet end of a length of garden hose, and a jet orifice disposed longitudinally medially of the body, a discharge portion of the bore of said body on the discharge side of the orifice which is at least one-half inch in length being tapered with the larger end of said tapered bore portion disposed towards the discharge end of the body, said orifice effecting restricted communication of fluid between the inlet portion of the longitudinal bore of said body and said discharge portion thereof, said body being provided with a relatively small bore extending transversely through a transverse wall of the body with its inner end terminating in an orifice of the inner wall of the bore of said body which is disposed immediately at the beginning of said discharge bore portion at the discharge side of said jet orifice, said jet orifice being substantially 9/64 inch in diameter, and the minimum diameter of the portion of the body bore immediately adjacent to the discharge side of said orifice being approximately 11/64 inch in diameter, and succeeding portions of said discharge bore portion being of no less diameter than 11/64 of an inch, and means associated with said body adjacent the outer surface of its lateral wall for effecting communication of said chemical solution from an exterior container to said body through said transverse bore of the body.

3. The water jet pump substantially as set forth in claim 1, characterized by said tapered bore portion having opposite longitudinal sides defining an included angle of approximately 5½ degrees.

4. The water jet pump substantially as set forth in claim 1, characterized by the body bore being abruptly increased from the jet orifice diameter of approximately 9/64 of an inch to an expanded diameter of approximately 11/64 of an inch at the discharge side, of said jet orifice.

5. A water jet pump of the type described comprising a tubular body having a longitudinal bore extending throughout its length, and a jet orifice disposed longitudinally medially of the body, a discharge portion of the bore of said body on the discharge side of the orifice being tapered with the larger end of said tapered bore portion disposed towards the discharge end of the body, said orifice effecting restricted communication of fluid between the inlet portion of the longitudinal bore of said body and said discharge portion thereof, said body being provided with a 'relatively small bore extending transversely through a transverse wall of the body with its inner end terminating in an orifice of the inner wall of the bore of said body which is disposed substantially at the discharge side of said jet orifice and communicating with said body bore in a longitudinally disposed portion of its length which is positioned in the line of flow from said orifice prior to the beginning of any tapered portion of said bore, said jet orifice being approximately 9/64 inch in diameter, and the minimum diameter of all portions of the body bore on the discharge side of said orifice being greater than the diameter of the orifice, and fluid conducting means associated with said body adjacent the outer surface of its lateral wall for effecting communication of a fluid from an exterior source to said body through said transverse bore of the body, said tapered bore portion having all opposite side inner wall surfaces extending angularly outwardly relative to each other along lines diverging at an angle, said tapered discharge portion of the bore being not less than one-half inch in length.

ORREL A. PARKER.